350-96.24 SR
XR 3,919,561
1 ( 50 72R

United States Patent [19]

Coberley

[11] 3,919,561

[45] Nov. 11, 1975

[54] REGISTER CONTROL SCANNER ASSEMBLY AND METHOD

[75] Inventor: Daniel A. Coberley, Danville, Ill.

[73] Assignee: Hurletron Altair, Danville, Ill.

[22] Filed: May 28, 1974

[21] Appl. No.: 473,873

[52] U.S. Cl. ................ 250/561; 250/227; 250/548; 250/571; 356/199; 350/96 B

[51] Int. Cl.[2] ..................... G02B 5/16; G01N 21/30

[58] Field of Search ........... 250/561, 571, 227, 202, 250/548; 350/96 B; 356/199

[56] References Cited

UNITED STATES PATENTS

| | | | |
|---|---|---|---|
| 3,244,878 | 4/1966 | Stein et al. | 250/227 X |
| 3,406,290 | 10/1968 | Brueschke | 250/202 |
| 3,476,482 | 11/1969 | Howard et al. | 250/227 X |
| 3,519,832 | 7/1970 | Castaldi | 250/227 X |
| 3,566,083 | 2/1971 | McMillin | 250/227 X |
| 3,629,579 | 12/1971 | Naitou | 250/227 X |

*Primary Examiner*—James W. Lawrence
*Assistant Examiner*—E. R. LaRoche
*Attorney, Agent, or Firm*—Hill, Gross, Simpson, Van Santen, Steadman, Chiara & Simpson

[57] ABSTRACT

For web register control systems, optical scanner assemblies comprising flexible light conduits terminating adjacent the web path with shaped light apertures suitably dimensionally correlated with the dimensions of the marks to be sensed and readily adjusted to desired longitudinal, lateral and angular positions relative to each other for optimum optical coupling with the marks to be sensed. Further disclosure relates to shifting of the scanner assemblies, along with the printing cylinder or the like relative to the web so as to establish a desired lateral registration with respect to previously applied patterns on the web.

8 Claims, 7 Drawing Figures

3919561
OR IN 250/561

REGISTER CONTROL SCANNER ASSEMBLY AND METHOD

SUMMARY OF THE INVENTION

This invention relates to a register control system and method, and particularly to optical scanner assemblies for cooperating with marks on a moving web for the purpose of determining the register condition of the web relative to a given station.

It is an object of the present invention to provide an optical scanner assembly which greatly facilitates the setup of a register control system.

It is another object of the invention to provide an optical scanner assembly of improved resolution.

A further particular object of the present invention is to provide a scanner assembly for register control systems which is essentially universally adaptable to varying requirements, thus avoiding the need for extensive and time-consuming optical design with respect to individual installations.

A further important object of the invention is to provide a novel work station in a register control system including an optical scanner assembly and operable for closed loop adjustment to a lateral register condition.

Another related object is to provide such a register control system wherein lateral adjustment at each successive station is relatively independent of the lateral registration control at preceding stations.

Other objects, features and advantages of the invention will be readily apparent from the following detailed description taken in connection with the accompanying drawings, although variations and modifications may be effected without departing from the spirit and scope of the novel concepts of the invention.

DETAILED DESCRIPTION OF THE PREFERRED EMBODIMENT

Figures 1, 2, 3:
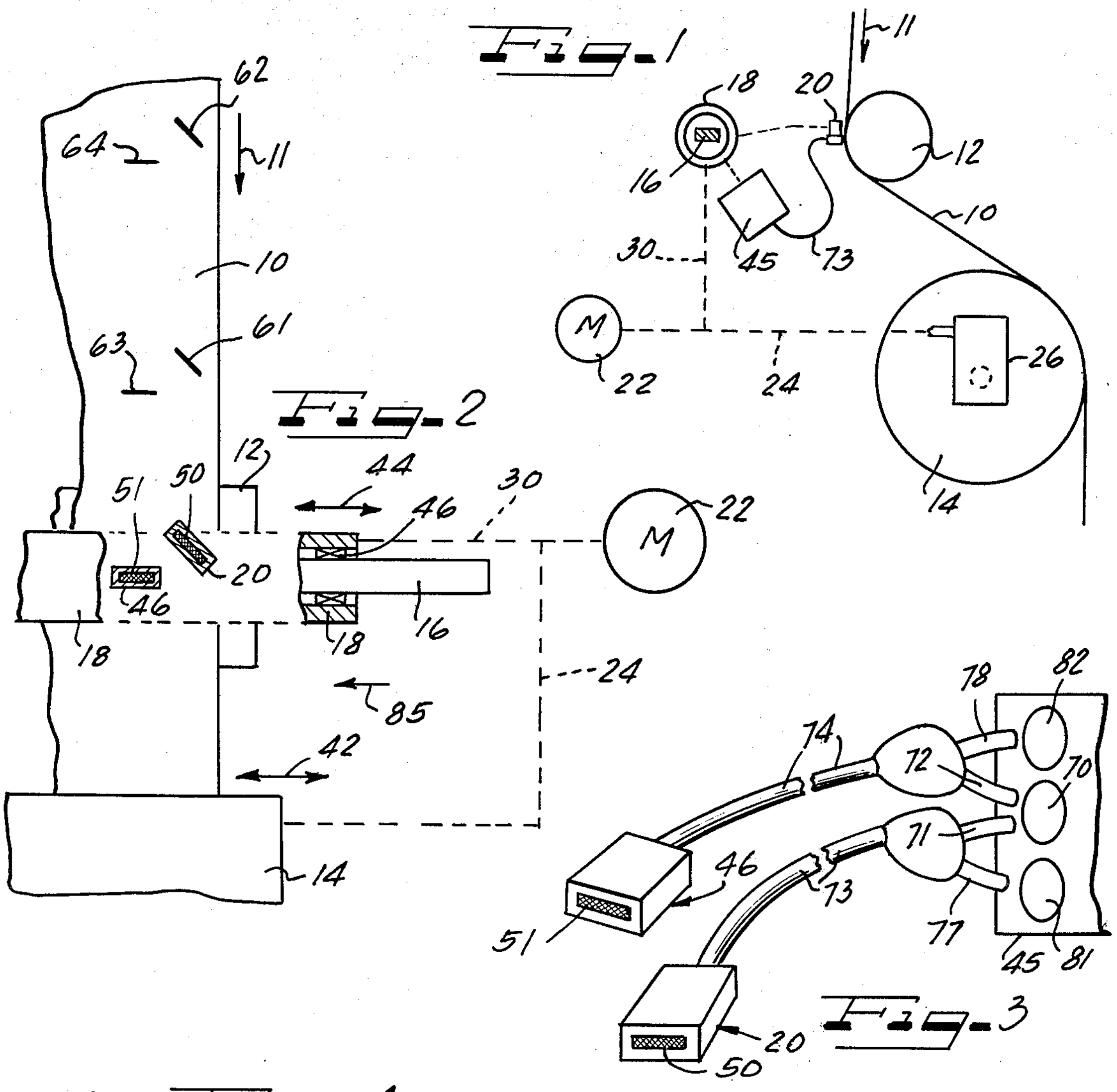
FIG. 1 is a diagrammatic view illustrating a path of a web in a printing apparatus by way of example, and indicating optical scanner assemblies mechanically coupled with a laterally shiftable printing cylinder of a printing station for joint lateral adjustment to maintain a lateral register condition.
FIG. 2 is a diagrammatic fragmentary view illustrating certain preferred details with respect to a printing station such as indicated in FIG. 1 the thickness dimension of the optical apertures being greatly exaggerated.
FIG. 3 is a diagrammatic perspective view illustrating a dual scanner arrangement which is relatively universally adaptable, for example to the lateral and longitudinal register applications illustrated in FIG. 1.

In FIG. 1, a web is indicated at 10 having a direction of movement as indicated by arrow 11 and a path of travel extending successively past an idler roller 12 and a printing cylinder 14. With respect to the idler roller 12, there is illustrated a mounting bar 16 which may be fixedly secured with the framework of the printing apparatus. Slidably mounted on the bar 16 is a scanner mounting sleeve 18 which serves as a carriage for supporting scanner elements such as diagrammatically indicated at 20 which may be adjustably mounted relative to the carriage 18 but are adapted to be securely fixedly relative thereto during a web scanning operation.

It is previously known that a printing cylinder may be adjusted longitudinally of its axis by means of a manual sidelay adjustment, but in accordance with the present invention a suitable servo motor 22 is mechanically coupled as indicated at 24 with the sidelay adjustment mechanism for bearing 26 of the printing cylinder. The arrangement is such that carriage 18 will be adjusted axially in synchronism with the printing cylinder 14, and by way of example a mechanical coupling is indicated at 30 for coupling the motor 22 with carriage 18 so that the carriage 18 is driven in step with the printing cylinder 14 during any longitudinal adjustment thereof relative to the path of the web in establishing a lateral register condition at the printing station.

Referring to FIG. 2, there is illustrated in a diagrammatic plan view portions of the printing station of FIG. 1 and illustrating the lateral adjustment of printing cylinder 14 by means of a double arrow 42 and a corresponding lateral adjustment of carriage 18 by means of a double arrow 44. As diagrammatically indicated at 46 suitable bushings may be interposed between carriage 18 and fixed bar 16 permitting the desired axial adjustment of sleeve 18 along with printing cylinder 14. By way of example the power train from motor 22 may be such as to move the printing cylinder 14 and the carriage 18 at a rate of 1.23 inches per minute, with a total range of travel of 1.5 inches.

Referring to FIG. 3, a scanner box 45 is diagrammatically indicated for fixed attachment to the carriage 18 at any desired position therealong. Associated with the box 45 are scanner elements 20 and 46. The optical apertures 50 and 51 are to be fixedly disposed at a precise critical distance such as one-eighth inch from the web. By way of example the diagrammatically indicated rectangular apertures 50 and 51 may have width dimensions of about 19 millimeters and thickness dimensions of about one millimeter. Thus, the apertures 50 and 51 as shown in FIG. 2 essentially correspond in thickness dimension to the thickness dimensions of the series of marks on the web 10 such as indicated at 61, 62, 63 and 64. As diagrammatically indicated in FIG. 3, box 45 may include a suitable light source 70 for supplying light to branches 71 and 72 of respective fiber optical conduits 73 and 74. The optical fibers of branches 71 and 72 are randomly intermixed with the fibers of return branches 77 and 78 which supply return light to respective photocells diagrammatically indicated at 81 and 82. By way of example the individual optical fibers providing the respective individual light paths from the light receiving inlets of branches 71 and 72 to apertures 50 and 51, and those providing the respective light paths receiving reflected light at apertures 50 and 51 and extending to the light emitting outlets of branches 77 and 78 may all have the same length and may each have a diameter of 0.003 inch. By the use of relatively fine cross-section optical fibers, it is entirely feasible to implement the branches 71 and 72 and 77 and 78 with a circular optical cross-section, and yet to furnish light uniformly to the rectangular optical apertures 50 and 51 and to receive reflected light uniformly over the aperture areas. Further, the conduits 73 and 74 can be very flexible e.g. accommodating a bend radius of one inch so that the light conduits are bendably and twistably adjustable relative to the scanner box 45 such that the apertures 50 and 51 can be angularly, laterally and longitudinally adjusted to accommodate marks such as indicated at 61—64 of different location and angular orientation on the web. By way of example, the optical apertures 50 and 51 may be sufficiently thin so as to resolve marks having a clear space therebetween in the direction of web movement of only one millimeter.

Where marks such as indicated at 61 and 62 have been applied at a previous printing station, these marks will represent a desired lateral register condition for the printing to be carried out by printing cylinder 14. The phase of the optical pulses supplied to apertures 50 and 51 as a result of the different light reflective properties of marks such as 61 and 63 will then serve to indicate the degree of lateral register between the printed web and the printing cylinder 14. For example, suitable micrometer adjustments may be supplied for scanner elements 20 and 46, such that with the proper lateral register between the web 10 and the printing cylinder 14, light pulses will be simultaneously transmitted to the optical apertures 50 and 51. If, then, the web should move in the leftward direction relative to cylinder 14 and apertures 50 and 51 as viewed in FIG. 2, it will be seen that mark 61 will arrive at the aperture 50 sooner, and the leading phase of the optical pulse at aperture 50 can be utilized to actuate motor 22 so as to cause printing cylinder 14 and optical apertures 50 and 51 to "follow" the lateral deviation of the web 10, that is motor 22 would drive printing cylinder 14 and apertures 50 and 51 in a leftward direction as indicated by arrow 85 in FIG. 2. By laterally adjusting the printing cylinder 14 and the optical apertures 50 and 51, the web 10 need not be laterally adjusted at the printing station, and accordingly the problem of the lateral shifting of the web at one station, affecting lateral register at succeeding stations is avoided.

By way of example, light conduits such as indicated at 73 and 74, may exhibit a light loss of 10 percent per foot, so that the conduits 73 and 74 can have any convenient length such as two feet or more.

An advantageous feature of the construction is that the explosion proof box diagrammatically indicated at 45 in FIGS. 1 and 3 can be mounted at a convenient point remote from the web so that the box does not obstruct visual observation of the marks. Further, mechanical obstructions in the vicinity of the scanning location are readily avoided. Also, tedious and specialized custom design of rigid optical paths to accommodate a desired remote location of the scanner box 45 is unnecessary, and to the contrary the desired relative positions of two or more scanner elements from the same box can be readily and fully adjustable to adapt the design of the present invention to a wide range of applications. The use of flexible conduits such as indicated at 73 and 74 facilitates observation of widely separate separated mark channels and even marks on different sides of the web, while retaining the scanner preamplifier electronics within a single scanner box as indicated at 45.

Typical electronics for scanners such as indicated in FIG. 3 is found in my U.S. Pat. No. 3,812,351 issued May 21, 1974.

Figure 4:
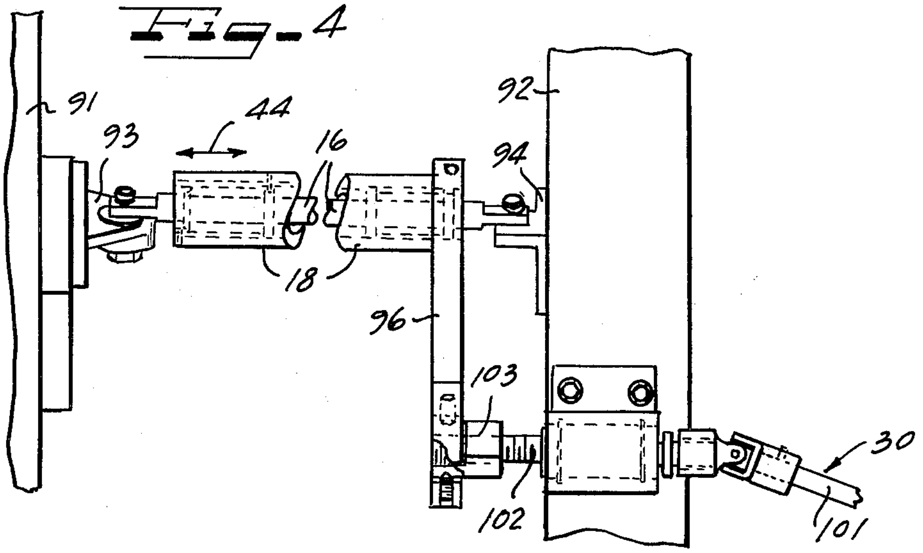
FIG. 4 is a somewhat diagrammatic fragmentary view illustrating details of a laterally shiftable optical scanner assembly for the printing station of FIG. 1.

FIG. 4 illustrates exemplary details of a carriage 18 for mounting a scanner box such as indicated at 45 in FIG. 3 and for association with a printing station such as indicated in FIG. 2. In particular side frames of a gravure printing unit are indicated at 91 and 92 to which are secured brackets 93 and 94 carrying the mounting rod 16. A scanner beam mover arm 96 is shown as being rigidly connected with carriage 18, and the mechanical coupling indicated at 30 in FIG. 2 is indicated as comprising a U-joint shaft 101 for driving a mover screw 102. Arm 96 carries a split nut 103 drivingly engaged with screw 102, so that rotation of shaft 101 causes the desired axial movement of sleeve 18 as indicated by arrow 44.

Figure 5:
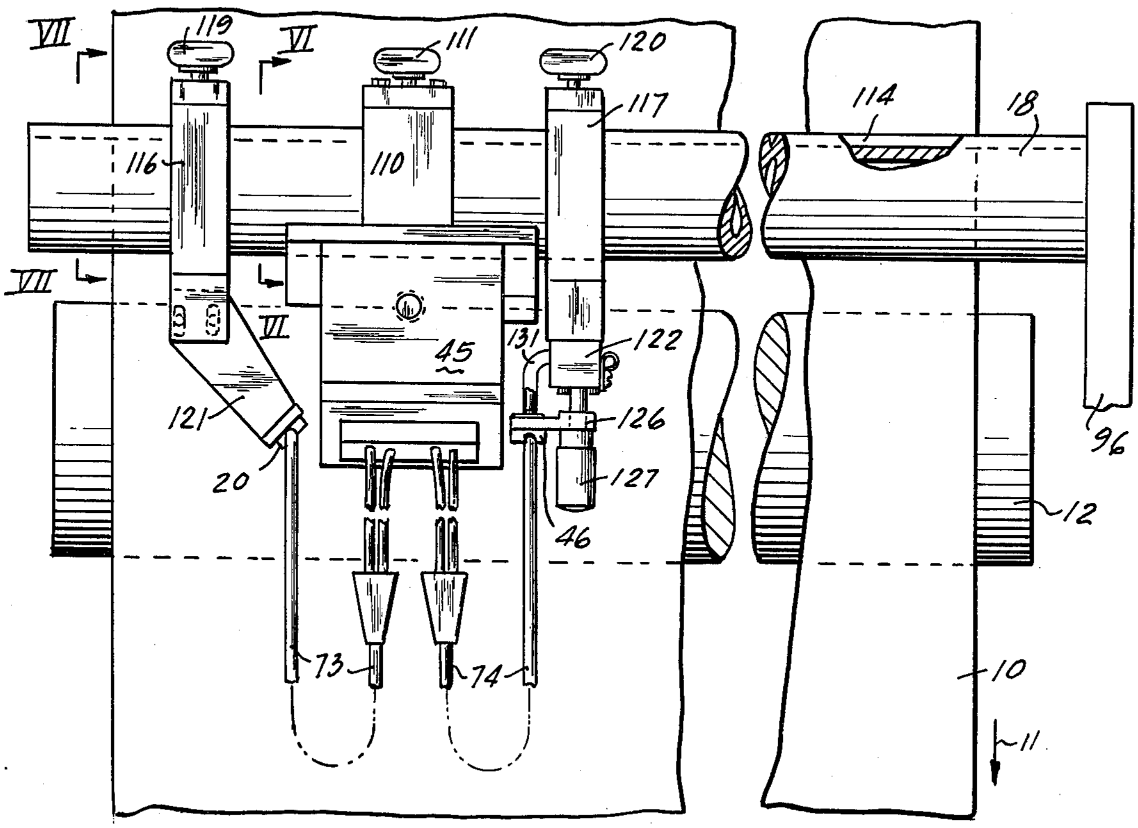
FIG. 5 is a somewhat diagrammatic fragmentary view showing details of adjustable rigidifying elements for fixing the scanner optical apertures relative to the web path, and applicable to the laterally shiftable dual scanner of FIGS. 1–4.
Figure 6:
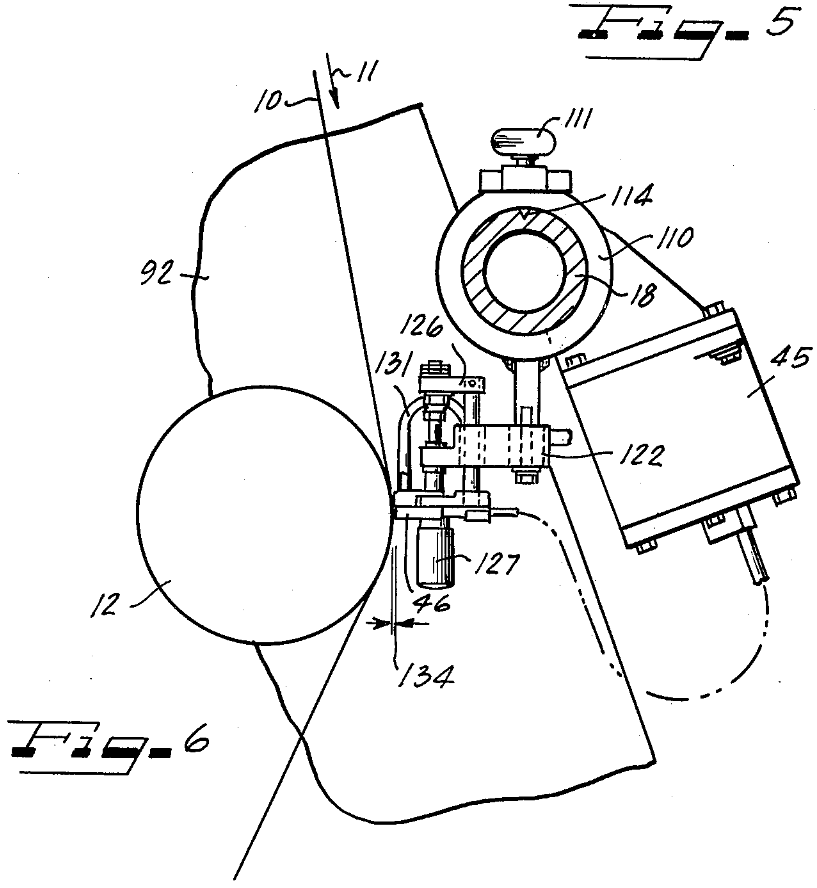
FIG. 6 is a somewhat diagrammatic transverse sectional view taken generally along the line VI—VI of FIG. 5.
Figure 7:
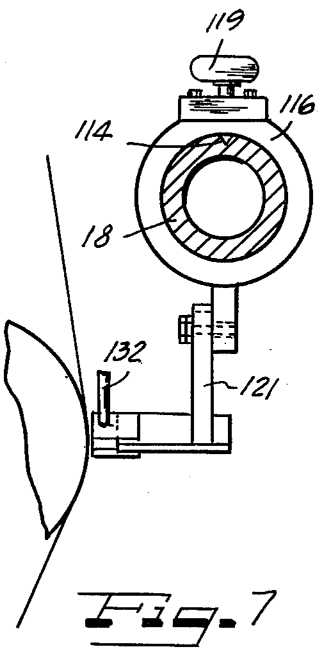
FIG. 7 is a somewhat diagrammatic transverse sectional view taken generally along the line VII—VII of FIG. 5.

FIGS. 5, 6 and 7 illustrate further details of the scanner assembly which may be operable to control both lateral and longitudinal register of web 10 relative to printing cylinder 14, the longitudinal web compensator being located in advance of idler roller 12. The scanner 51 may sense the phase of marks such as 63 and 64 relative to respective detector signals from a position detector operating in synchronism with printing cylinder 14 as described in U.S. Pat. No. 3,812,351 issued May 21, 1974.

Referring to FIG. 5, scanner box 45 is shown as being provided with rider 110 having a position screw assembly 111 for engaging in a V-shaped notch 114 of carriage sleeve 18. The groove extends for the length of the sleeve 18, so that the box can be located at any desired point along the sleeve 18. While riders 116 and 117 for conduits 73 and 74 have been shown on opposite sides of the box 45, the riders 116 and 117 may be on the same side if this is more convenient in a given installation. Manually operated screw assemblies are indicated at 119 and 120 for fixing the riders 116 and 117 at any desired location along the length of the carriage 18.

For rigidly positioning the respective ends of the light conduits 73 and 74 adjacent the path of the web 10, the riders 116 and 117 are provided with rigidifying arms 121 and 122 which are angularly adjustable relative to the riders 116 and 117. The arm 122 carries an adjustment bracket 126 which provides for microadjustment of the position of the optical aperture 51 longitudinally of the web by means of manipulation of adjustment knob 127. Tubing such as indicated at 131 and 132 may open adjacent the optical apertures 50 and 51 for supplying purging air to the region of optical coupling of the conduits 73 and 74 with the web. As indicated at 134, the optical apertures may be adjusted to a relatively critical clearance distance relative to the web such as one-eighth inch. With the illustrated embodiment, the web may have a width of for example 70 inches, and the scanner optical apertures 50 and 51 may have a range of lateral adjustment from a spacing of three-fourths inch to a spacing of 36 inches, center line to center line, for example. In any selected lateral position and any desired angular orientation relative to the direction of movement of the web, the auxiliary rigidifying arms such as 121 and 122 stably retain the optical apertures of the conduits 73 and 74 in scanning relation to the path of the marks of interest and in an orientation corresponding to the orientation of the marks as indicated in FIG. 2. The micrometer adjustment assembly which is actuated by the knob 127 may provide a very fine screw thread type adjustment of the optical aperture 51 along the web path so as to adjust aperture 51 to receive a mark substantially simultaneously with aperture 50 in the lateral register condition of the web. Control of motor 22 to maintain lateral register may utilize conventional register control circuitry such as indicated in U.S. Pat. No. 3,624,359 issued Nov. 30, 1971, for example.

It will be apparent that many modifications and variations may be affected without departing from the scope of the novel concept of the present invention.

I claim as my invention:

1. In a register control scanner assembly for sensing passage of marks on a web wherein light is transmitted to the path of the marks, and reflected light from the marks is sensed by electric circuitry to produce electric scanner pulses for use in controlling register, a light conduit element having individual optical fibers randomly distributed between an incoming light bundle and an outgoing light bundle at an end of the element remote from the path of the marks, said optical fibers at the opposite end of the conduit element adjacent the path of the marks providing a cross-sectional configuration arranged to essentially match the geometry of a linear mark, mounting means for retaining the end of the element remote from the path of the marks stationary relative to said mounting means during a mark scanning operation, said light conduit element being of bendable and twistable construction so as to be bendably and twistably adustable relative to said end thereof remote from the path of the marks so as to accommodate marks of different location and angular orientation while said end thereof remote from the path of the marks remains stationary, and auxiliary rigidifying means carried by said mounting means and connected with said opposite end of the conduit element adjacent the path of the marks,and being laterally and angularly adjustable and being operable for stably retaining said opposite end in scanning relation to the path of the mark during a mark scanning operation while accommodating lateral and angular adjustment of such opposite end so as to correspond to different lateral positions and angular orientations of the marks on the web.

2. A register control scanner assembly according to claim 1, with said opposite end of said light conduit element having a cross-sectional configuration defining an optical aperture with a relatively large width dimension and a relatively small thickness dimension, the thickness dimension being sufficiently small to enable the resolution of marks with a clearance spacing therebetween of one millimeter.

3. A register control scanner assembly in accordance with claim 1, with said mounting means comprising a mounting bar, and a carriage movably mounted on said bar, and carrying said light conduit element and said rigidifying arms for unitary movement therewith relative to the mounting bar.

4. A register control scanner assembly in accordance with claim 3, with servo drive means coupled to said carriage for driving the same in a lateral direction relative to the direction of movement of the web in restoring a register condition between the light conduit element and the web.

5. In a register control scanner assembly for sensing passage of marks on a web moving along a web path wherein light is transmitted to the path of the marks, and reflected light from the marks is sensed by electric circuitry to produce electric scanner pulses for use in controlling register, a light conduit element having individual optical fibers randomly distributed between an incoming light bundle and an outgoing light bundle at an end of the element remote from the web path of the marks, said optical fibers at the opposite end of the conduit element adjacent the path of the marks providing as cross-sectional configuration arranged to essentially match the geometry of a linear mark, a mounting bar disposed at a fixed location along the web path and extending transversely of the web path in spaced relation thereto, a carriage movably mounted on said mounting bar for adjustment transversely of the web path and having means for adjustably locating the carriage at any desired position along said mounting bar, said carriage having means carrying the end of the light conduit element remote from the web path and for holding such end stationary when the carriage is stationary, said light conduit element being of bendable and twistable construction so as to be bendably and twistably adjustable relative to said end thereof remote from the path of the marks to assume different lateral positions and different angular orientations and thus to accommodate marks of different location and angular orientation while said end thereof remote from the path of the marks remains stationary, and auxiliary rigidifying arms carried by said carriage and connected with said opposite end of the conduit element adjacent the web path for stably retaining said opposite end in any of said different lateral positions and angular orientations during web scanning operation thereof.

6. In a web register control system, means defining a path of web movement, a register control scanner assembly mounted adjacent the path of web movement and operable for sensing passage of marks at a selected mark position on a web moving along said path during a work operation, a flexible light conduit element having a sensing end adjacent the web path and having a remote end carried by said scanner assembly, said remote end including an incoming light path for supplying light to the sensing end for impingement on the web and an outgoing light path for receiving light reflected from marks at the selected mark position on the web to produce scanner pulses for use in controlling register during such work operation, and auxiliary rigidifying means carried by said scanner assembly and connected with said sensing end of the conduit element adjacent the web path for stably retaining said sensing end in a selected scanning relation to the web path during the work operation, said rigidifying means having incremental adjustment means mounting said sensing end for incremental adjustment relative to said scanner assembly for adjustment of the position of said sensing end relative to the remote end of said flexible light conduit in precisely positioning said sensing end for scanning relation to a selected mark position on the web.

7. A web control system according to claim 6 with said incremental adjustment means being carried by said auxiliary rigidifying means and providing micrometer adjustment for said sensing end relative to said remote end.

8. A web control system according to claim 6 with servo drive means coupled to said scanner assembly for driving the same in a lateral direction relative to the direction of movement of the web during restoration of a register condition of the web.

* * * * *